United States Patent
Choudhary et al.

(10) Patent No.: US 7,685,385 B1
(45) Date of Patent: Mar. 23, 2010

(54) SYSTEM AND METHOD FOR SATISFYING I/O REQUESTS BEFORE A REPLICA HAS BEEN FULLY SYNCHRONIZED

(75) Inventors: Anurag Choudhary, Pune (IN); Arvind Arun Pande, Pune (IN); Raghu Krishnamurthy, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1068 days.

(21) Appl. No.: 11/193,844

(22) Filed: Jul. 29, 2005

Related U.S. Application Data (60) Provisional application No. 60/695,827, filed on Jun. 30, 2005.

(51) Int. Cl.
*G06F 12/00* (2006.01)
(52) U.S. Cl. .................................... 711/162
(58) Field of Classification Search ............... None
See application file for complete search history.

(56) References Cited

U.S. PATENT DOCUMENTS

| | | | | |
|---|---|---|---|---|
| 7,039,661 | B1 * | 5/2006 | Ranade | 707/204 |
| 7,117,386 | B2 * | 10/2006 | LeCrone et al. | 714/6 |
| 7,178,055 | B2 * | 2/2007 | Ji et al. | 714/6 |
| 7,181,581 | B2 * | 2/2007 | Burkey | 711/161 |
| 2004/0078637 | A1 | 4/2004 | Fellin et al. | 714/6 |
| 2005/0050115 | A1 | 3/2005 | Kekre | 707/204 |

* cited by examiner

*Primary Examiner*—Brian R Peugh
(74) *Attorney, Agent, or Firm*—Campbell Stephenson LLP (57) ABSTRACT

Various methods and systems are disclosed for handling I/O requests to a replica that has not yet been fully synchronized. One method involves detecting the transfer of the role of working volume from a first volume to a second volume. The second volume is configured as a replica of the first volume, but the second volume may not be fully synchronized with the first volume at the time that the role of working volume is transferred. Subsequent to the role of working volume being transferred to the second volume, a read request to the second volume is satisfied by accessing a log. The log is configured to store values that have been written to the first volume, and at least one of the values written to the first volume has not been written to the second volume.

20 Claims, 4 Drawing Sheets

SYSTEM AND METHOD FOR SATISFYING I/O REQUESTS BEFORE A REPLICA HAS BEEN FULLY SYNCHRONIZED

FIELD OF THE INVENTION

This invention relates to data storage systems and, more particularly, to performing replication within a data storage system.

DESCRIPTION OF THE RELATED ART

Replication is one technique utilized to minimize data loss and improve the availability of data. During replication, a copy of the same data stored at each of several sites or nodes. If the working copy (the copy currently being used by an application) of that data is lost, one of the replicated copies can be used.

Metrics typically used to assess or design a particular replication system include recovery point objective (RPO) and recovery time objective (RTO) performance metrics. The RPO metric is used to indicate the point in time to which data (e.g., application data, system state, and the like) must be recovered by a replication system. In other words, RPO indicates how much data loss (e.g., 2 hours worth of data loss) can be tolerated by applications associated with the replication system. The RTO metric is used to indicate the time within which systems, applications, and/or operations associated with the replication system must be recovered.

Optimally, a replication system would provide for instantaneous (zero RTO) and complete (zero RPO) recovery of data from one or more remote sites at a great distance from the data-generating primary node. However, implementation of such a replication using conventional techniques would be extremely inefficient, in terms of both write operation latency and cost. In particular, the cost of the high-speed link(s) required by such replication systems has discouraged their implementation however in all but a small number of application environments.

Replication systems in which high-frequency data replication is performed over short, high-speed links, as well as systems in which low-frequency data replication is performed over longer, low-speed links, similarly suffer from a number of drawbacks (e.g., a poor RPO metric, high write operation/application latency, high cost, and the like). Consequently, a number of replication systems have been implemented in which such short-distance, high-speed/frequency replication (e.g., real-time or synchronous replication) is coupled (e.g., cascaded) with long-distance, low-speed/frequency replication. In a cascaded replication system, copies of all the data generated and/or stored at the primary node are maintained at both an intermediary node (e.g., via short-distance, high-speed/frequency replication between the primary and intermediary nodes) and a secondary node (e.g., via long-distance, low-speed/frequency replication between the intermediary and secondary nodes).

In some cascaded replication systems, the secondary node stores a full copy while the intermediary node only stores data that has recently been modified at the primary node. This modified data can then be sent to the secondary node via low speed and/or frequency replication. After the modified data is sent to the secondary node, it can be deleted from the intermediary node. This reduces the amount of information that needs to be stored at the intermediary node; however, since the intermediary node no longer stores a full copy of the data at the primary node, an application cannot failover to the intermediary node.

If the primary node fails, any application(s) executing on the primary node can be failed over to the secondary node. However, if the application is failed over immediately, there may be an undesirably high RPO, since the secondary is likely to be at least somewhat behind relative to the primary and intermediate nodes. If instead the application is not failed over until all of the data at the intermediary node has been copied to the secondary node, an undesirably high RTO may result. As this shows, it is difficult to improve either RTO or RPO without negatively impacting the other metric. Accordingly, improved techniques for handling failover in replication systems are desired.

SUMMARY

Various embodiments of methods and systems are disclosed for handling I/O requests to a replica that has not yet been fully synchronized. In one embodiment, a method involves detecting that a second volume has been designated as the working volume. Prior to detection of this new designation, a first volume was the working volume. The second volume is configured as a replica of the first volume. The method also involves satisfying a read request to the second volume by accessing a log, subsequent to detecting that the second volume has been designated as the working volume. The log is configured to store values written to the first volume, and at least one of the values written to the first volume has not been written to the second volume.

Values can be stored in the log while the first volume is still the working volume (i.e., before the role of working volume has been transferred to the second volume). For example, an entry corresponding to a write access can be appended to the log, in response to detecting the write access to a first region of the first volume. The entry stores information identifying the first region and a new value of the first region. In one embodiment, the log is stored at a bunker site, while the first volume is located at a first site and the second volume is located at a second site.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

During replication, changes to a primary replica are synchronously replicated to an intermediary log (e.g., at the primary site or at an intermediary bunker site). A secondary replica is also maintained at a secondary site. The secondary replica is a full copy of the primary replica, but may be out-of-sync with the primary replica. If the primary replica fails, an application can be failed over to a secondary replica. Mapping information maps the data in the intermediary log to the secondary replica. Until all of the information in the intermediary log has been copied to the secondary replica, the mapping information is used to selectively redirect read requests from the secondary replica to the intermediary log, so that the application will always receive the most recent version of the data. By ensuring that the application receives the most recent version of the data in response to read requests, the application can be allowed to begin sending I/O requests to the secondary replica before the secondary replica has been fully synchronized.

Figure 1:
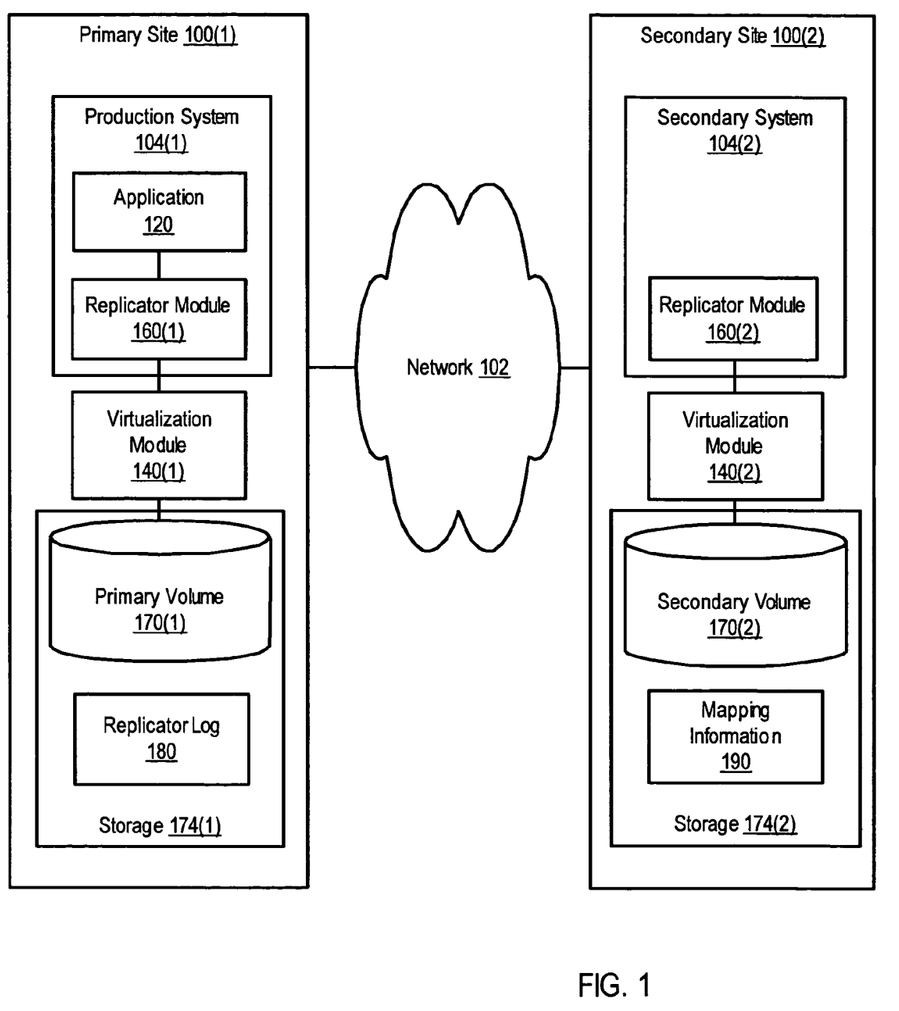
FIG. 1 is a block diagram of a replication system, according to one embodiment of the present invention.

FIG. 1 is a block diagram of a system for performing replication from a primary volume to a secondary volume. This system includes a primary site 100(1) and a secondary site 100(2). Collectively, sites 100(1) and 100(2) are referred to as sites 100. Primary site 100(1) and secondary site 100(2) are coupled by a network 102. Network 102 can include a WAN (Wide Area Network), such as the Internet, one or more LANs (Local Area Networks), and/or one or more SANs (Storage Area Networks).

Primary site 100(1) includes a production system 104(1), which implements the functionality of an application 120 and a replicator module 160(1). Primary site 100(1) also includes a virtualization module 140(1) and a primary volume 170(1). In some embodiments, virtualization module 140(1) is implemented in hardware and/or software on a network switch, network appliance, or storage device controller (e.g., an array controller). In alternative embodiments, virtualization module 140(1) is implemented in software that executes on production system 104(1). While FIG. 1 shows a situation in which replication module 160(1) is implemented in software that executes on production system 104(1), it is noted that replicator module 160(1) can alternatively be implemented in hardware and/or software on a host, network switch, network appliance, or storage device controller (e.g., an array controller). Additionally, in one embodiment, replicator module 160(1) is implemented as part of a virtualization component such as VERITAS Volume Replicator (™), available from VERITAS Software Corp., of Mountain View, Calif.

While FIG. 1 illustrates a situation in which there is a single production system with respect to data in primary volume 170(1), it is noted that in alternative embodiments, multiple production systems can be present. For example, a distributed file system (such as the cluster file system (CFS) provided by VERITAS Storage Foundation (™), available from VERITAS Software Corp., of Mountain View, Calif.) can be executed on each of several different nodes within a cluster, allowing each node to act as a production system.

Secondary site 100(2) includes secondary system 104(2), which implements the functionality of replicator module 160(2), as well as virtualization module 140(2) and a secondary volume 170(2). Like virtualization module 140(1), virtualization module 140(2) and/or replicator module 160(2) can be implemented in hardware and/or software on secondary system 104(2) or on another device (e.g., a network switch, appliance, or storage device controller).

The production system controls access to files on primary volume 170(1). A file system (not shown) can provide the interface via which users, such as application 120, access files on primary volume 170(1) (alternatively, application 120 can be a file system). It is noted that the production system could implement other mechanisms (e.g., databases, object-based storage, or the like) for abstracting data objects on volume 170(1) instead of and/or in addition to a file system. In general, the production system includes functionality that provides an abstraction of data to user applications and that maps abstract data objects such as files to locations on a storage device (e.g., primary volume 170(1)).

Each system 104(1) and 104(2) (collectively, systems 104) can include one or more computing devices configured to execute software implementing various applications (e.g., application 120, virtualization module 140(1) or 140(2), and/or replicator module 160(1) or 160(2)). In such embodiments, each system 104 can include a workstation, personal computer, server, PDA (Personal Digital Assistant), cell phone, storage network switch, storage device, storage array controller, or any other device configured to execute software implementing such applications. Alternatively, each system 104 can be implemented from one or more logic devices (e.g., PLDs, FPGAs, and the like) configured to perform the functions of such applications. Systems 104 can also be implemented using logic devices that are configured to perform some of the functions of the applications and that are also configured to execute software implementing other functions of the applications.

Application 120 is an example of an application that accesses files on primary volume 170(1). Application 120 can be any one of a variety of applications, such as a database application, a word processing application, and the like. It is noted that in some embodiments, application 120 is distributed in nature (e.g., like Oracle Parallel Server (™) or Oracle RAC (™), available from Oracle Corporation of Redwood Shores, Calif.). Such applications can access the same data (or files) from different production systems.

Virtualization modules 140(1) and 140(2) (collectively, virtualization modules 140) each create and manage one or more logical storage devices such as primary volume 170(1) and secondary volume 170(2). Each virtualization module 140 can be either in-band (e.g., the virtualization component can implemented in the data path of data being written to the volumes) or out-of-band (e.g., the virtualization component can sit outside the data path). Applications such as databases and file systems view and access the logical volumes managed by the virtualization component in the same way that the applications would view and access physical storage devices.

Replicator modules 160(1) and 160(2) at the primary and secondary sites cooperate to maintain a replica (a consistent copy) of information stored on primary volume 170(1) on secondary volume 170(2). Consistency ensures that, even if the secondary volume is not identical to the primary volume (e.g., updates to the secondary volume may lag behind updates to the primary volume), the secondary volume always represents a state of the primary volume that actually existed (or could have existed without violating any write-ordering rules) at a previous point in time. For example, if an application performs a sequence of writes A, B, and C to the primary volume, consistency can be maintained by performing these writes to the secondary volume in the same sequence. At no point should the secondary volume reflect a state that never actually occurred on the primary volume, such as the state that would have occurred if write C was performed before write B.

Each data volume 170(1) and 170(2) can be implemented on one or more physical storage devices. For example, as shown, primary volume 170(1) is implemented on storage device 174. A physical storage device can be a single device (e.g., a single hard drive, CD (Compact Disc) drive, or DVD (Digital Versatile Disc) drive). Alternatively, a storage device may include an array of such devices (e.g., a RAID array of several hard drives controlled by a hardware array controller). Also, portions of more than one data volume can be implemented on the same physical storage device. It is noted that although a logical storage volume is shown in the illustrated example, other embodiments can use similar techniques to replicate data objects (such as files) that are stored directly on a physical storage device.

During normal operation, replicator modules 160(1) and 160(2) interact with each other (e.g., by sending requests and/or data to each other via network 102 and by respectively controlling activity that affects primary volume 170(1) and secondary volume 170(2)) in order to maintain secondary volume 170(2) as a replica of primary volume 170(1). This involves detecting operations that modify values stored in primary volume 170(1), and sending information identifying those operations across network 102 so that the operations can be applied to secondary volume 170(2). Thus, during replication, incremental changes that occur to primary volume 170(1) (e.g., due to applications such as application 120 modifying, creating, and/or deleting information on primary volume 170(1)) are replicated to secondary volume 170(2).

Secondary volume 170(2) may be somewhat out-of-sync with primary volume 170(1) in certain situations. For example, when application 120 modifies data stored on primary volume 170(1), latencies associated with transferring those modifications across network 102 may result in secondary volume 170(2) storing a less recent version of the replicated data than primary volume 170(1). These amount of data that can differ among the volumes can vary depending upon both the nature of network 102 (e.g., whether the network includes long-distance and/or low speed connections) and the nature of the type of replication being performed (e.g., whether synchronous, asynchronous, or periodic replication is being performed). For example, if asynchronous or periodic replication is being performed, and if network 102 is relatively low speed, secondary volume 170(2) is likely to store an out-of-date version of the data, relative to the version of the data stored in primary volume 170(1). In general, the volumes are out of sync whenever the non-working volume stores data that does not correspond to the current state of the working volume.

If primary volume 170(1) becomes inaccessible (e.g., due to a storage device failure, maintenance, network failure, or the like), application 120 can be failed over to secondary system 104(2). Before application 120 can be failed over, however, it is desirable to synchronize secondary volume 170(2) as much as possible with the most recent pre-failure version of primary volume 170(1) in order to reduce the RPO associated with the replication system. At the same time, it is desirable to failover the application as quickly as possible in order to reduce RTO.

To facilitate failover situations having reduced RPO and RTO, modifications to primary volume 170(1) are stored in a replicator log 180. Replicator module 160(1) can store these modifications in replicator log 180 synchronously, as the modifications are applied to primary volume 170(1). For example, each time application 120 writes to primary volume 170(1), the new data being written is stored in both primary volume 170(1) and replicator log 180. In some embodiments, replicator log 180 stores only the values that have been written to primary volume 170(1) but not to secondary volume 170(2). In such embodiments, replicator log 180 can be implemented as a queue or other suitable data structure. In other embodiments, replicator log 180 is actually a full copy of primary volume 170(1), and can be implemented as a separate volume.

When the failure of primary volume 170(1) is detected, replicator module 160(1) (or replicator module 160(2)) generates or updates mapping information 190 if needed (e.g., if replicator module 160(1). Mapping information 190 maps the information currently stored in replicator log 180 to secondary volume 170(2). Replicator module 160(1) then sends a copy of mapping information to replicator module 160(2) via network 102. Replicator module 160(2) uses mapping information 190 to determine whether to respond to read requests with data from secondary volume 170(2) or data from replicator log 180.

After a copy of mapping information 190 has been stored at secondary site 100(2), as shown in FIG. 1, application 120 can be restarted on secondary system 104(2). Application 120 can be restarted before all (or any) of the information in replicator log 180 has been applied to secondary volume 170(2), and application 120 will be allowed to have I/O access (e.g., to generate read and write requests) to secondary volume 170(2) as soon as application 120 is restarted. Mapping information 190 is used to redirect certain read accesses to secondary volume 170(2) while data is still being copied from replicator log 180 to secondary volume 170(2).

In some embodiments, before application 120 is failed over (i.e., before the role of working volume is assigned to secondary volume 170(2)), replicator module 160(2) generates a snapshot (or other point-in-time copy) of the secondary volume 170(2). This snapshot preserves a consistent (although unsynchronized) image of the application data. The snapshot can be used if an error and/or failure occurs before secondary volume 170(2) has been synchronized with the most recent pre-failure version of primary volume 170(1). In other words, if an error occurs while the values in replicator log 180 are being copied to secondary volume 170(2), the application can be recovered using the consistent copy of the data stored in the snapshot.

As noted above, mapping information 190 maps the information in replicator log 180 to secondary volume 170(2). For example, if replicator log 180 is a queue that currently has four entries, each of which stores a value that was written to primary volume 170(1) by application 120 before the failover, mapping information 190 can identify the portion of secondary volume 170(2) that corresponds to each of those entries. Accordingly, mapping information 190 can be used to identify which portions of secondary volume 170(2) are out of sync. If, for example, the second entry in replicator log 180 stores the new value of block A of secondary volume 170(2), mapping information 190 will indicate that the most recent value of block A is stored in replicator log 180. If application 120 attempts to read block A from secondary volume 170(2), replicator module 160(2) will return the version of the data that is stored in the second entry of replicator log 180 instead of the out-of-sync version of the data that is stored in block A of secondary volume 170(2). If there are multiple entries in the log for block A, replicator module 160(2) will return the value stored in the most recent entry for block A. In one embodiment, mapping information 190 stores information that is used to locate a value identified by a tuple, which includes a volume identifier (used to differentiate among volumes if several volumes are being replicated) and a logical block number, within replicator log 180.

As values in replicator log 180 are copied to secondary volume 170(2), replicator module 160(2) updates mapping information 190. Additionally, these values can be deleted from replicator log 180 (e.g., by explicitly removing such values or by moving a pointer to the head of the queue to the next entry in the queue). For example, if the first entry in replicator log 180 corresponds to block B of secondary volume 170(2) (and if no other entries in replicator log 180 correspond to block B), information identifying block B will be removed from mapping information 190 as soon as replicator module 160(2) has written block B (or a group of values that include the new value of block B) to secondary volume 170(2). Additionally, replicator module 160(1) can remove that value of block B from replicator log 180 as soon as replicator module 160(2) acknowledges that the new value of block B has been written to secondary volume 170(2). After all of the values in replicator log 180 have been copied to secondary volume 170(2), replicator module 160(2) can delete mapping information 190.

Replicator module 160(2) can also update the mapping information 190 if application 120 writes to secondary volume 170(2). For example, if application 120 writes a new value to block C of secondary volume 170(2), replicator module 160(2) can update mapping information 190 to indicate that block C is now synchronized on secondary volume 170(2), since the most current version of the data stored in block C is now stored on the secondary volume. If a write operation affects a range of blocks, then mapping information 190 is updated for each of the affected blocks.

While the above example has focused on failover in situations in which primary volume 170(1) fails, it is noted that similar techniques can be performed in other situations. For example, replicator log 180 and mapping information 190 can be used to quickly failover application 120 from primary site 100(1) to secondary site 100(2) in order to allow maintenance to be performed on one or more components of primary site 100(1).

While FIG. 1 illustrates a system configured to replicate files on a single data volume, other embodiments support replication of files from multiple data volumes. In such embodiments, the group of data volumes at the primary site 100(1) can be included in a primary replication volume group. Files on this primary replication volume group are then replicated to one or more volumes at the secondary site 100(2).

In some embodiments, there are multiple secondary volumes 170(2) (or replication volume groups) to which replicator module 160 replicates files in primary volume 170(1) (or a primary replication volume group). Identical replication operations are typically performed to all secondary volumes.

The example of FIG. 1 shows replicator modules 160(1) and 160(2) and virtualization modules 170(1) and 170(2) as independent modules. It is noted that in alternative embodiments, the functionality of these modules can be combined and/or implemented in other ways. For example, replicator module 160(1) and virtualization module 170(1) can be combined into a single module.

Figure 2:
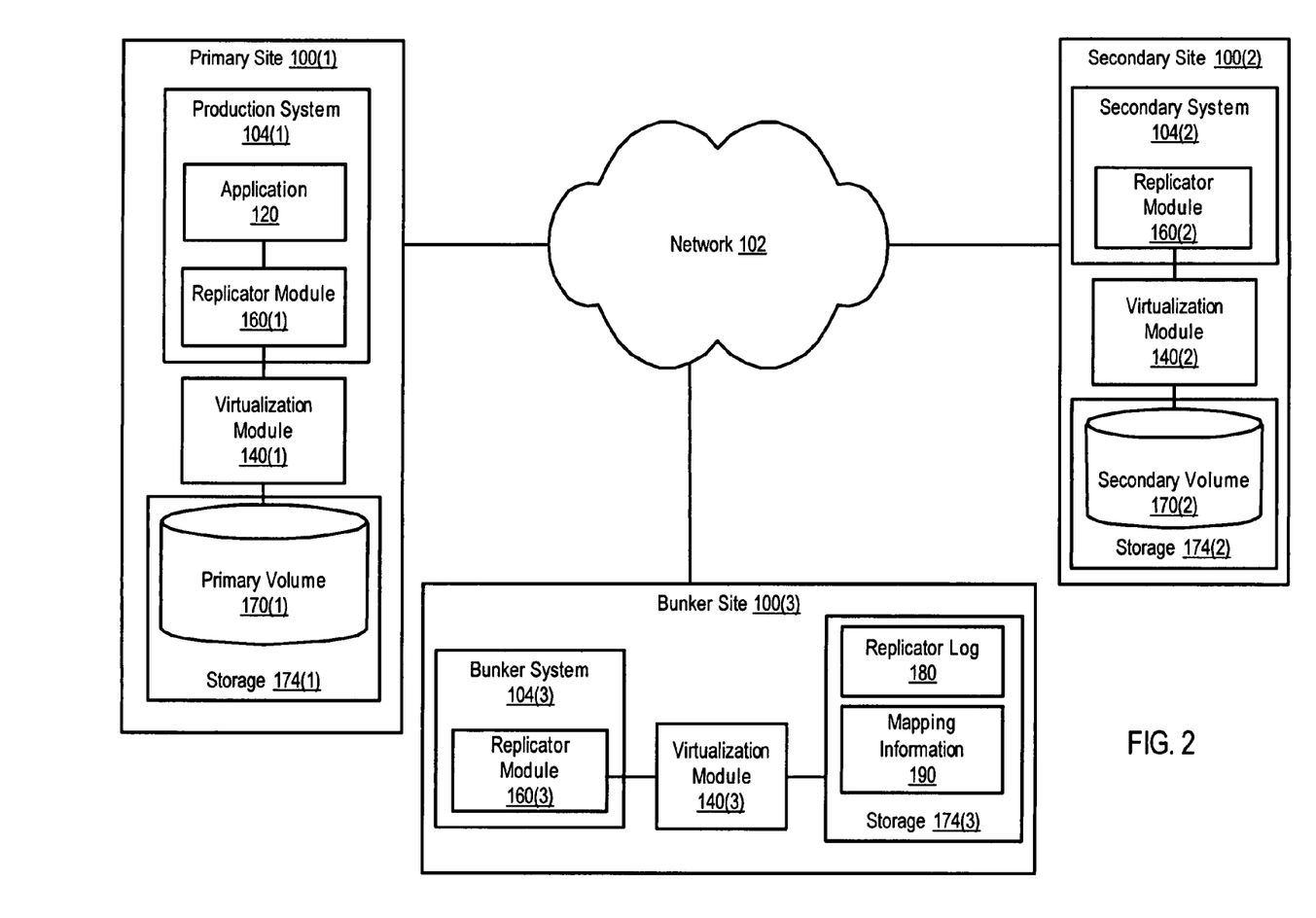
FIG. 2 is a block diagram of a cascaded replication system, according to one embodiment of the present invention.

FIG. 2 shows a cascaded replication system. As in the non-cascaded replication system of FIG. 1, the cascaded replication system of FIG. 2 includes primary and second sites 100(1) and 100(2), and secondary volume 170(2) is maintained as a replica of primary volume 170(1). Components of FIG. 2 function similarly to the similarly numbered components of FIG. 1.

In addition to the components of FIG. 1, the cascaded replication system of FIG. 2 also includes a third site, bunker site 100(3). Bunker site 100(3) includes a bunker system 104(3) (which can be implemented in a similar manner to primary and secondary systems 104(1) and 104(2)), a virtualization module 140(3) (which can be implemented in a manner similar to virtualization modules 140(1) and 140(2)), and storage 174(3) (which can be implemented in a manner similar to storage 174(1) and 174(2)). Bunker system 104(3) implements replicator module 160(3). Storage 174(3) stores replicator log 180 and mapping information 190.

Replicator module 160(3) interacts with replicator module 160(1) to maintain replicator log 180 as at least a partial copy of primary volume 170(1). In particular, the replicator modules ensure that replicator log 180 stores (at least) any values that have been written to primary volume 170(1) but that have potentially not been written to secondary volume 170(2). Thus, replicator log 180 stores values that have not yet been sent to secondary site 100(2), as well as values that have been sent to secondary site 100(2) but not acknowledged. It is noted that replicator log 180 can, in some embodiments, be a synchronized copy of a similar log (e.g., as shown in FIG. 1) that is maintained at primary site 100(1).

Replicator module 160(3) also generates mapping information 190. As in the system of FIG. 1, mapping information 190 is used to map values in replicator log 180 to secondary volume 170(2). In one embodiment, replicator module 160(3) only generates mapping information 190 in response to detecting that primary volume 170(1) has failed. In other embodiments, replicator module 160(3) maintains mapping information 190 at regular intervals (e.g., every hour) and/or in response to predesignated stimuli (e.g., in response to each modification to replicator log 180).

In some embodiments, bunker site 100(3) is an intermediary site at a location that is closer to primary site 100(1) than secondary site 100(2). For example, bunker site 100(3) can be located a few miles (e.g., less than 10) away from primary site 100(1), while secondary site 100(2) is located many miles (e.g., several hundred or more) away from primary site 100(1). Bunker site 100(3) is coupled to primary site 100(1) by a higher-speed link than a network coupling primary site 100(1) to secondary site 100(2). Additionally (or alternatively), the type of replication (e.g., synchronous replication) performed between primary site 100(1) and bunker site 100(3) can be performed at a higher frequency than the type of replication (e.g., asynchronous or periodic) performed between primary site 100(1) and secondary site 100(2) or between bunker site 100(3) and secondary site 100(2).

Bunker site 100(3) can maintain either a full copy of primary volume 170(1) or a partial copy. For example, the partial copy can be a log that only stores new values that have been written to primary volume 170(1) but that are not yet confirmed as having been written to secondary volume 170(2). This log can be a synchronized copy of a log, maintained at the primary site, that stores changes that have recently been applied to the primary volume. Additionally, bunker site 100(3) can either be used as an intermediate "hop" for data being replicated (e.g., changes are copied first to bunker site 100(3) from primary site 100(1), and then to secondary site 100(2) from bunker site 100(3)) or as an independent destination for replication (e.g., changes are copied to bunker site 100(3) from primary site 100(1) while also being copied to secondary site 100(2) directly from primary site 100(1)). For example, in one embodiment, bunker site 100(3) maintains a full synchronized copy of primary volume 170(1) and is not used as an intermediate hop for data. In this embodiment, bunker site 100(3) can be used as a failover site. In another embodiment, bunker site 100(3) maintains a synchronized partial copy of primary volume 170(1) and is used as an intermediate hop for replication to secondary site 100(2). In yet another embodiment, bunker site 100(3) maintains a synchronized partial copy of primary volume 170(1) but is not used as an intermediate hop for replication to secondary site 100(2).

Application 120 can be failed over to secondary site 100(2) (e.g., to allow maintenance to be performed on components of primary site 100(1) or to recover from a failure at primary site 100(1)). Before the failover occurs, replicator module 160(3) generates and/or updates mapping information 190 (if mapping information 190 is not already up to date) and sends a copy of mapping information 190 to secondary site 100(2). It is noted that in alternative embodiments, replicator module 160(2) at secondary site 100(2) may generate mapping information 190 (e.g., in response to receiving a copy of replicator log 180).

Once secondary site 100(2) has a copy of mapping information 190, application 120 can be restarted at secondary site 100(2), with full I/O access to secondary volume 170(1). Replicator module 160(2) can use mapping information 190 to selectively redirect read requests generated by application 120. In particular, if mapping information 190 indicates that the most recent value of the data specified in the read request is available in replicator log 180 (i.e., if the value of that data stored in secondary volume 170(2) is out of sync), replicator module 160(2) will ensure that the read request is satisfied by returning the value from the replicator log to the application. In this situation, mapping information 190 can be used to both identify that the most recent value of the requested data is stored in replicator log 180 and to locate that value within replicator log 180. In contrast, if mapping information 190 indicates that secondary volume 170(2) stores the most recent value of the requested data, the request is satisfied normally by returning the value stored in secondary volume 170(2).

In one embodiment, replicator module 160(2) redirects read requests by simply transferring the requested value from replicator log 180(2) to secondary site 100(2) and returning that value to the application. In another embodiment, if a read request needs to be redirected, replicator module 160(2) transfers the requested value from replicator log 180 to secondary site 100(2), stores the value on secondary volume 170(2), and then allows the read request to be satisfied from secondary volume 170(2). In such an embodiment, mapping information 190 is updated to indicate that the current value of that data is now located in secondary volume 170(2).

While replicator module 160(2) is redirecting read requests, the other values still stored in replicator log 180 are being copied to secondary volume 170(2). As these values are written to secondary volume 160(2), mapping information 190 is updated to indicate that secondary volume 160(2) now stores these values, instead of replicator log 180. Prediction techniques (e.g., based on read locality) can be used to prioritize the transfer the values that are next expected to be read by application 120.

Additionally, if application 120 writes to secondary volume 170(2), replicator module 170(2) can update mapping information 190 to indicate that secondary volume 170(2) now stores the current value of the portions of secondary volume 170(2) that have been written to. At this point, it is no longer necessary to copy the earlier versions of those portions of secondary volume 170(2) from replicator log 180.

Figure 3:
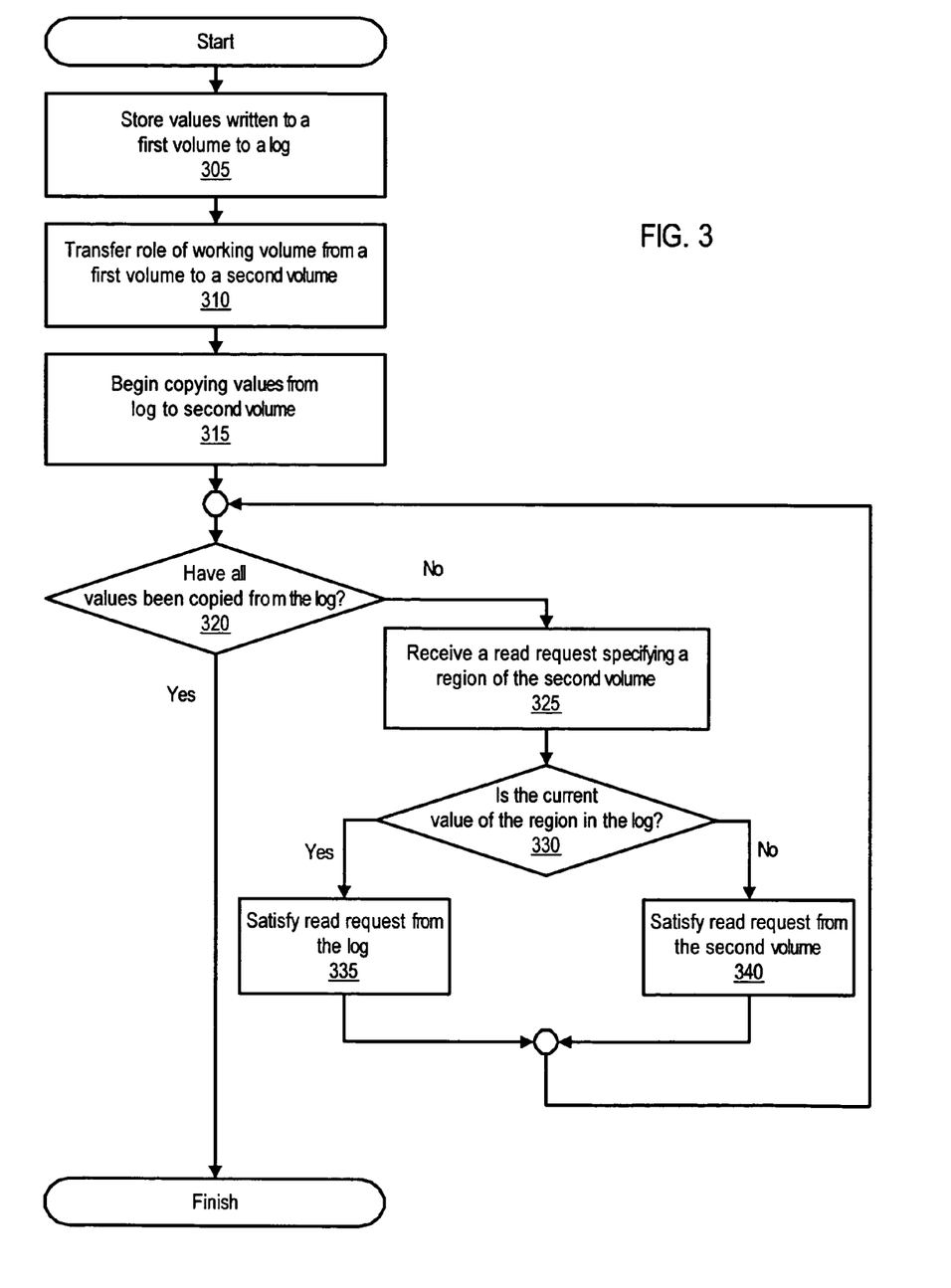
FIG. 3 is a flowchart of one embodiment of a method of satisfying I/O requests to a replica that has just become the working volume, before that replica has been fully synchronized with the previous working volume.

FIG. 3 is a flowchart of a method of handling I/O requests to a volume that has just been assigned the role of working volume. The method uses mapping information that indicates which regions of the new working volume are not up to date. For regions of the new working volume that are not up to date, the mapping information also identifies where the up-to-date values are located within a replicator log. As used herein, a region is a byte, block, extent (e.g., a fixed or variable-sized group of several blocks, which can be specified with a starting address and, in some cases, a length), or other unit of data that can be handled as an entity by each storage device. For example, in one embodiment, each region is a block, which is the smallest atomic entity capable of being handled by the underlying storage device(s) being used.

The method of FIG. 3 begins at 305, when values that are being written to a first volume are stored in a log. It is noted that if a write access affects multiple regions, the new value of each affected region will be stored in the log. Operation 305 can be performed by a replicator module. In one embodiment, the replicator module that stores the values in the log is located at the same site as the first volume, and the log is stored at that site (e.g., as illustrated in FIG. 1). Alternatively, the log can be stored at a bunker site (e.g., as illustrated in FIG. 2). The log is a full copy (e.g., a mirror or synchronous replica) of the first volume in some embodiments. In other embodiments, the log only stores values that have been written to the first volume but that have not yet been acknowledged as being written to the second volume. Operation 305 can be performed for the duration of normal operation (i.e., an operating state in which the role of working volume remains assigned to the first volume).

At 310, the role of working volume is transferred from the first volume to a second volume (e.g., by restarting an application, using data in the second volume). The second volume is being operated as a replica of the first volume and is located at a different site than the first volume. The values stored by the second volume may be out of sync with respect to the first volume (e.g., due to a non-synchronous type of replication being performed and/or due to replication being performed over relatively low speed links). The role of working volume can be transferred in response to a failure of the first volume (or another component of the first site) or in response to the need to perform maintenance at the first site. It is noted that operation 310 may not be performed until mapping information, which identifies which regions of the second volume are out of sync and locates the correct values of those regions in the log, has been generated and transferred to the same site as the second volume.

At 315, copying activity begins, in order to copy those values stored in the log that have not yet been written to the second volume to the second volume. This activity continues until all of those values have been copied to the second volume, as indicated at 320.

While the values are being copied from the log to the second volume, the application may send read requests (i.e., requests to initiate a read operation, which performs a read access to the second volume) that specify regions of the second volume. Such a read request is received at 325. Operation 325 can be performed by a replicator module.

At 330, a determination as to whether the current (i.e., the most recent) value of each region specified in the read request is located in the log (as opposed to being located in the second volume). For example, mapping information is used to determine whether the current value of the region specified by the read request is located in the log or in the second volume. If the read request specifies a region and the current value of the region is located in the log, the read request is satisfied from the log, as indicated at 335. Satisfying the read request from the log involves reading the specified data from the log, transferring data from the log to the site at which the second volume is located over a network, and then writing the transferred data to the second volume. If the current value of the region is located in the second volume, the read request is satisfied normally from the second volume, as shown at 340.

If the read request spans multiple blocks, the determination as to whether the current value is located in the log is made on a block-by-block basis for each block specified in the read request. For example, mapping information can be consulted for each individual block in order to figure out the location of the current version of that block. The read request can be satisfied using a combination of blocks from the second volume (for blocks that are already synchronized on the second volume) and blocks from the log (for blocks that are not yet synchronized on the second volume).

Satisfying the read request from the log involves retrieving the requested value from the log and returning the value to the application that generated the read request. In one embodiment, this is accomplished by storing the value retrieved from the log to the appropriate region of the second volume, thus making that region current, and then allowing the read request to be performed to the region of the second volume.

Operations 305-340 can be repeated until all of the values in the replicator log have been copied to the second volume. It is noted that in some embodiments, the operations illustrated in FIG. 3 can be combined and/or reordered. Additionally, in other embodiments, different operations can be performed instead of and/or in addition to those operations illustrated in FIG. 3.

Figure 4:
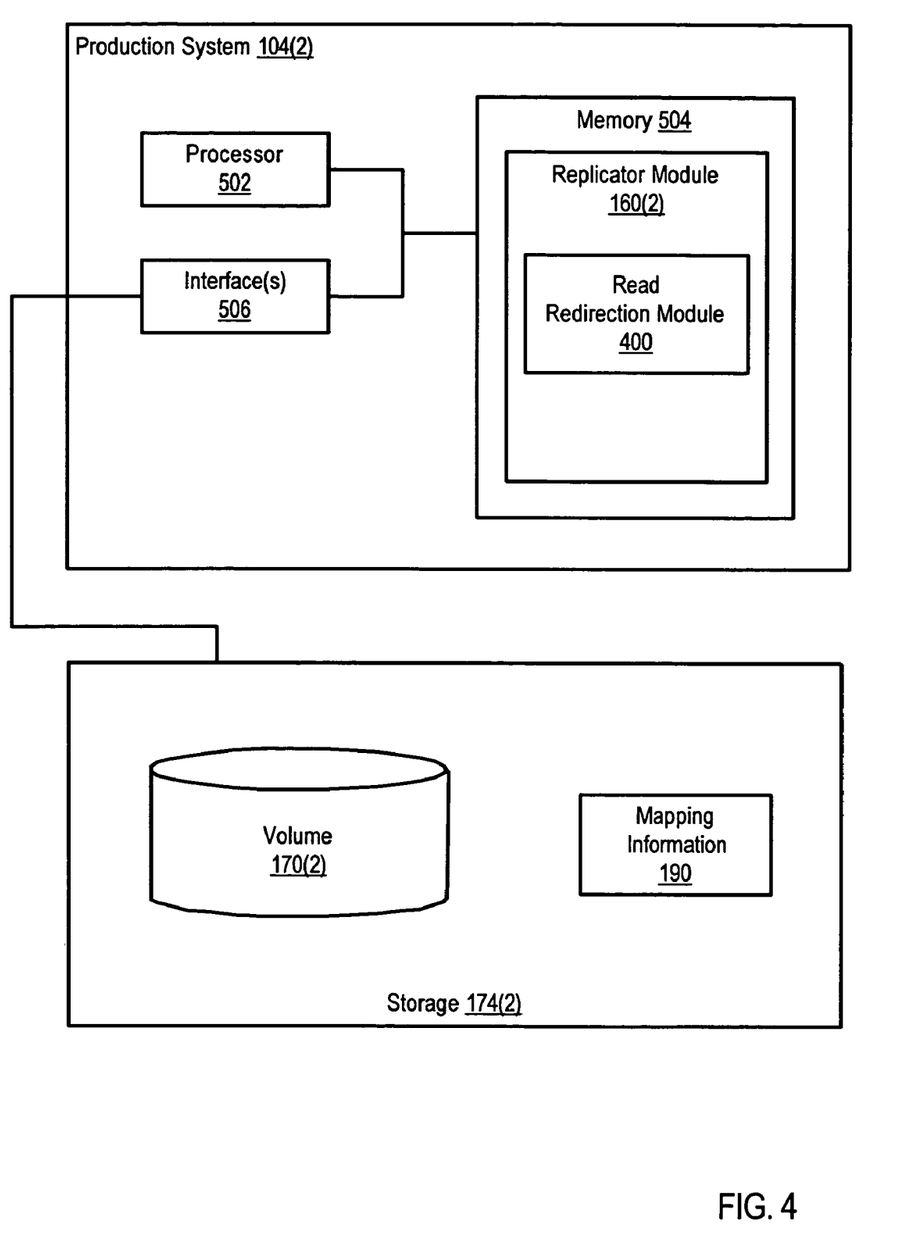
FIG. 4 is a block diagram of a computer system, according to one embodiment of the present invention.

FIG. 4 illustrates a block diagram of a computing device that is operating as a secondary system 104(2) (e.g., one of the secondary systems shown in FIGS. 1 and 2). It is noted that similar computing devices can be used to implement primary system 104(1) and/or bunker system 104(3) (e.g., as shown in FIGS. 1 and/or 2). As illustrated, secondary system 104(2) includes one or more processors 502 (e.g., microprocessors, PLDs (Programmable Logic Devices), or ASICs (Application Specific Integrated Circuits)) configured to execute program instructions stored in memory 504. Memory 504 can include various types of RAM (Random Access Memory), ROM (Read Only Memory), Flash memory, MEMS (Micro Electro-Mechanical Systems) memory, and the like. Production system 104(1) also includes one or more interfaces 506. Processor 502, interface 506, and memory 504 are coupled to send and receive data and control signals by a bus or other interconnect.

Interface 506 can include a network interface to various networks and/or interfaces to various peripheral buses. Interface 506 can include an interface to one or more storage devices, such as those that provide storage 174(2). Interface 506 can also include an interface to a network, for use in communicating with other nodes and/or for use in communicating with networked storage devices.

In this example, program instructions executable to implement an instance of a replicator module 160(2) are stored in memory 504. Replicator module 160(2) includes read redirection module 400, which can implement techniques to satisfy read requests from either secondary volume 170(2) or a replicator log (e.g., located at a primary or bunker site). Read redirection module 400 can initiate and/or perform operations such as those illustrated at 325, 330, 335, and 340 of FIG. 3. Read redirection module 400 uses mapping information 190 to determine whether to redirect read requests that initially specify regions of secondary volume 170(2).

The program instructions and data implementing the replicator module can be stored on various computer readable media such as memory 504. In some embodiments, such software is stored on a computer readable medium such as a CD (Compact Disc), DVD (Digital Versatile Disc), hard disk, optical disk, tape device, floppy disk, and the like). In order to be executed by processor 502, the instructions and data implementing the replicator module are loaded into memory 504 from the other computer readable medium. The instructions and/or data implementing the replicator module can also be transferred to primary system 104(1) for storage in memory 504 via a network such as the Internet or upon a carrier medium. In some embodiments, a computer readable medium is a carrier medium such as a network and/or a wireless link upon which signals such as electrical, electromagnetic, or digital signals, on which the data and instructions implementing a replicator module are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting a designation of a second volume as a working volume, wherein
      prior to the detecting, a first volume is the working volume,
      the designation occurs in response to the first volume becoming inaccessible, and
      the second volume is configured as a replica of the first volume; and
   satisfying a read request to the second volume by accessing a log, subsequent to detecting the designation of the second volume as the working volume, wherein
      the log stores values written to the first volume and at least one of the values written to the first volume has not been written to the second volume,
      the satisfying the read request comprises retrieving a value from the log, and
      the read request is satisfied prior to writing the value to the second volume.

2. The method of claim 1, further comprising:
   appending, to the log, an entry corresponding to a write access, in response to detecting the write access to a first region of the first volume; wherein
      the entry stores information identifying the first region and a new value of the first region.

3. The method of claim 2, further comprising:
   storing the log at a bunker site, wherein
      the first volume is located at a first site, and
      the second volume is located at a second site.

4. The method of claim 3, further comprising:
   generating a map, wherein
      the map stores information mapping entries in the log to the second volume;
   detecting a read request to a region of the second volume, wherein
      the read request is generated by an application;
   determining whether a most recent value of the region is stored in the log, based on the map;
   accessing the log, if the map indicates that the most recent value of the region is stored in the log; and
   returning the most recent value to the application.

5. A system comprising:
   a detection module configured to detect a designation of a second volume as a working volume, wherein prior to the detection, a first volume is the working volume, and the designation occurs in response to the first volume becoming inaccessible;

a read redirection module configured to detect a read request to the first volume;

a computer readable storage medium coupled to the read redirection module and storing a log, wherein
the read redirection module is configured to satisfy the read request by retrieving data from the log, instead of from the first volume,
the read request is satisfied prior to writing the data to the first volume,
the log stores values written to a second volume that have not been written to the first volume, and
the first volume is a replica of the second volume.

6. The system of claim 5, wherein
the read request specifies a first region of the first volume,
the read redirection module is configured to access a map in response to detecting the read request, and
the map identifies whether a most recent value of the first region is stored in the log.

7. The system of claim 5, wherein
the first volume, log, and the read redirection module are located at a first site,
the second volume is located at a second site, and
the first site is coupled to the second site by a network.

8. The system of claim 7, wherein
the first volume and the read redirection module are located at a first site,
the log is located at a bunker site,
the second volume is located at a second site, and
a network couples the first site, second site, and bunker site.

9. A system comprising:
means for detecting a designation of a second volume as a working volume, wherein prior to the detecting, a first volume is the working volume,
the designation occurs in response to the first volume becoming inaccessible, and
the second volume is configured as a replica of the first volume;
means for accessing a log in order to satisfy a read request to the second volume, subsequent to detecting the designation of the second volume as the working volume, wherein
the log stores values written to the first volume and at least one of the values written to the first volume has not been written to the second volume,
the satisfying the read request comprises retrieving a value from the log, and
the read request is satisfied prior to writing the value to the second volume; and
a computer readable storage means for storing the log.

10. The system of claim 9, further comprising:
means for appending an entry corresponding to a write access to the log, in response to detecting the write access to a first region of the first volume; wherein
the entry stores information identifying the first region and a new value of the first region.

11. The system of claim 10, further comprising:
means for storing the log at a bunker site, wherein
the first volume is located at a first site, and
the second volume is located at a second site.

12. The system of claim 11, further comprising:
means for generating a map, wherein
the map stores information mapping entries in the log to second first volume;

means for detecting a read request to a region of the second volume, wherein
the read request is generated by an application;
means for determining whether a most recent value of the region is stored in the log, based on the map;
means for accessing the log, if the map indicates that the most recent value of the region is stored in the log; and
means for returning the most recent value to the application.

13. A computer readable storage medium comprising program instructions executable to:
detect a designation of a second volume as a working volume, wherein
prior to detecting the designation, a first volume is the working volume,
the designation occurs in response to the first volume becoming inaccessible, and
the second volume is configured as a replica of the first volume; and
access a log in order to satisfy a read request to the second volume, subsequent to detecting the designation of the second volume as the working volume, wherein
the log stores values written to the first volume and at least one of the values written to the first volume has not been written to the second volume,
the satisfying the read request comprises retrieving a value from the log, and
the read request is satisfied prior to writing the value to the second volume.

14. The computer readable storage medium of claim 13, wherein
the log comprises an entry,
the entry corresponds to a write access to a first region of the first volume, and
the entry stores information identifying the first region and a new value of the first region.

15. The computer readable storage medium of claim 14, wherein
the log is stored at a bunker site,
the first volume is located at a first site, and
the second volume is located at a second site.

16. The computer readable storage medium of claim 15, wherein the program instructions are further executable to:
detect a read request to a region of the second volume, wherein
the read request is generated by an application;
determine whether a most recent value of the region is stored in the log, based on a map, wherein
the map stores information mapping entries in the log to the second volume;
access the log, if the map indicates that the most recent value of the region is stored in the log; and
return the most recent value to the application.

17. A system comprising:
a processor; and
a memory coupled to the processor, wherein the memory stores program instructions executable by the processor to:
detect a designation of a second volume as a working volume, wherein
prior to detecting the designation, a first volume is the working volume,
the designation occurs in response to the first volume becoming inaccessible, and
the second volume is configured as a replica of the first volume; and access a log in order to satisfy a read request to the second volume, subsequent to detecting the designation of the second volume as the working volume, wherein the log stores values written to the first volume and at least one of the values written to the first volume has not been written to the second volume, the satisfying the read request comprises retrieving a value from the log, and the read request is satisfied prior to writing the value to the second volume.

18. The system of claim 17, wherein the log comprises an entry, the entry corresponds to a write access to a first region of the first volume, and the entry stores information identifying the first region and a new value of the first region.

19. The system of claim 18, wherein the log is stored at a bunker site, the first volume is located at a first site, and the second volume is located at a second site.

20. The system of claim 19, wherein the program instructions are further executable by the processor to:

detect a read request to a region of the second volume, wherein the read request is generated by an application;

determine whether a most recent value of the region is stored in the log, based on a map, wherein the map stores information mapping entries in the log to the second volume;

access the log, if the map indicates that the most recent value of the region is stored in the log; and return the most recent value to the application.

* * * * *